United States Patent Office 2,694,406
Patented Nov. 16, 1954

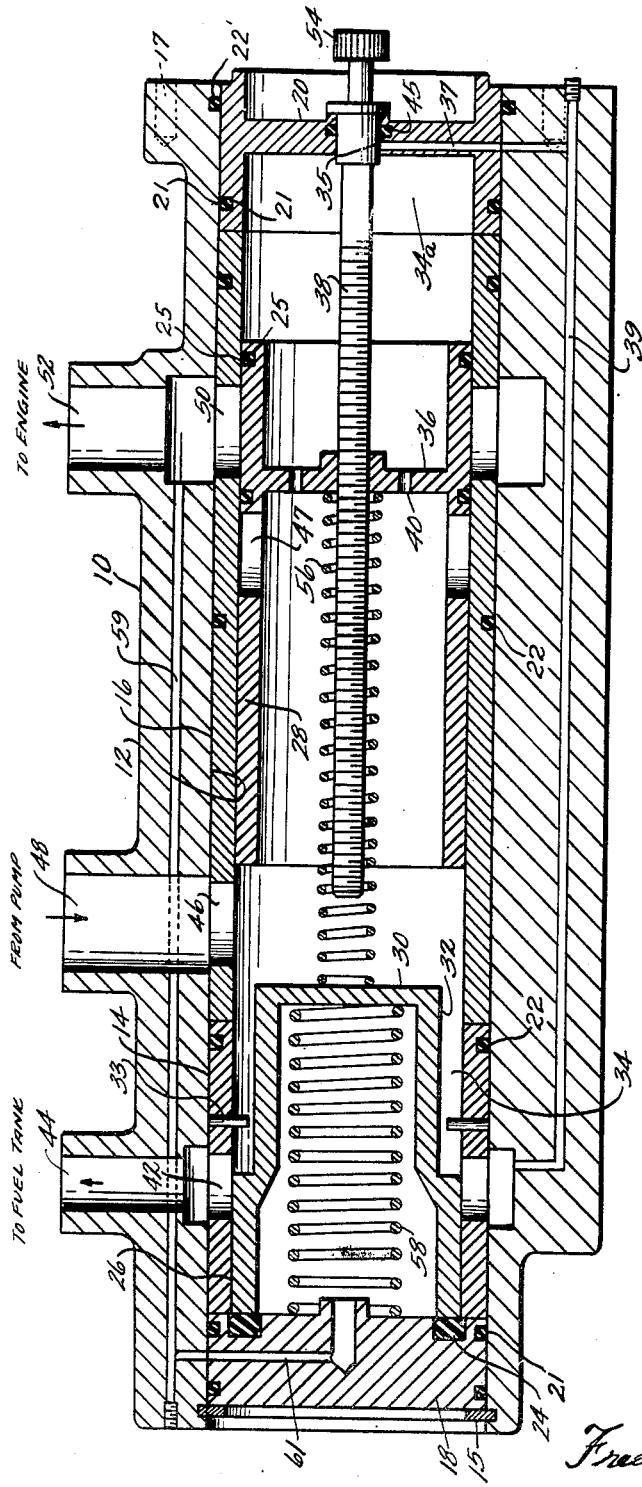

2,694,406

CONSTANT FLOW FUEL VALVE

Edgar H. Ayers, Niles, Mich., assignor to the United States of America as represented by the Secretary of the Air Force Application November 14, 1952, Serial No. 320,588

12 Claims. (Cl. 137—108)

This invention relates to fuel valves being in the nature of a bypass valve or relief valve, adapted to maintain an approximately constant output flow for any given valve position with variable valve inlet flow or valve outlet pressures.

The embodiment of my invention which is herein shown and described is particularly adapted for use in jet or turbo-jet engines and the single figure of the drawing shows an adaptation for this purpose.

Referring to the single figure of the drawing, a cast housing 10 is coupled at the right-hand end to a servo-motor frame (not shown) and held thereon by screws extending into tapped holes 17. Housing 10 is bored throughout its length as at 12 for two coaxial valve sleeves 14 and 16 which abut each other.

Plugs 18 and 20 respectively pressure close the left and right ends of the bore 12. Seals 12 prevent leakage between the plugs and the bore 12. Seals 22 and 22' additionally serve to prevent leakage between the sleeve elements and the bore 12 and the plug 20 and the bore 12 respectively. A spring snap ring 15 holds the plug 18 and sleeves 16 and 14 against end movement to the left in the housing and movement of plug 20 and the sleeves to the right is prevented by the servo frame mounting. The bore 12 extends the entire length of the housing 10.

Coaxial with and slidable in the valve sleeves 14 and 16 are piston valves 26 and 28. Piston valve 26 is closed at the right end as at 30 and is reduced in diameter as at 32 thereby leaving space 34 between the right-hand end portion of the piston and the inside of the valve sleeve 14 and provides an annular stop shoulder. Stop pins 33 are adapted to engage the stop shoulder to limit movement to the right of the piston 26.

Piston valve 28 has an integral partition 36 tapped centrally for a long threaded shaft 38 and provided with pressure equalizing holes 40. The outer ends of the piston valve 28 are open and the left-hand end has a diameter sufficient to receive the reduced diameter end 32 of the piston 26.

A port hole 42 in the side of the sleeve 14 registers with a passageway 44 to establish outflow communication, when the valve 26 is open as shown, between the space 34 and a fuel tank (not shown).

A second port hole 46 in the side of the sleeve 16 registers with a passageway 48 to establish inflow communication, when the valve 26 is open as shown, between the space 34 and a fuel pump (not shown).

A third port hole 50 in the side of the sleeve 16 registers with a passageway 52 to establish outflow communication, when the valve 28 is open (valve is shown closed) between the space 34 and an engine (not shown).

Port holes 42, 46 and 50 are fixed against axial movement with respect to the passageways 44, 48 and 52 by the fixed relation of the sleeves 14 and 16 in the bore.

The outflow passageway 44 to the fuel tank is shown open but may be closed by moving the piston 26 to the right. The outflow passageway 52 to the engine is shown closed but may be opened by moving the piston 28 to the right. Seals 25 afford a prevention of leakage between the sleeve 16 and valve 28 and in the closed position of the valve 28 the seals straddle the fuel delivery port 50. The inflow passageway 48 from the pump is shown open but may be closed by moving the piston 28 to the left.

The long threaded shaft 38 is rotatable in a bearing 35 in the right-hand plug 20 and extends outwardly beyond the bearing where it is provided with a small knob 54 for manually rotating the shaft 38 or for connecting the shaft 38 to some power adjusting means. A seal 45 adjacent the bearing 35 compels any fluid which may escape from the space 34a along the bearing 35 to return via passageway 37, and 39 into the outflow passageway 44 which extends to or is in communication with the fuel tank.

A relatively stiff spring 56 is mounted on the shaft 38 and slightly compressed between partition 36 and the end 30 of piston 26, whereby a uniform adjustable predetermined pressure is maintained between the outer end of piston 26 and the partition 36 in the valve 28, the shaft 38 being fixed against axial movement in the plug 20. A relatively light spring 58 is interposed under a light predetermined compression between the bottom of piston 26 and the end plug 18. A small passageway 59 and 61 extends from the fuel-to-engine passageway 52 to the inside of the piston 26, whereby the force of the spring 58 is combined with the pressure in passage 52 to balance the force in the space 34 operative against outside the piston 26 from the pump through passage 46.

With the valve in the off position shown and with fuel supplied to the inlet port 46 fuel can flow around the outside of piston valve 26 and out through the bypass port 44 back to the fuel tank. Flow of fluid between valve 26 and sleeve 14 to the outlet pressure hole in the plug or cap 18 is stopped by valve 26 seating in O ring 24. Valve 26 is forced against O ring 24 by the position of valve 28 acting through the stiff spring 56. The use of stiff spring 56 rather than having an extension of valve 28 on the end of the rod 38 engage valve 26 makes it possible to apply a specific predetermined yieldable force on the O ring rather than pushing it positively to a predetermined position. Flow or leakage of fuel between piston valve 26 and sleeve 14 is effectively stopped by O ring 24.

When threaded adjustment shaft 38 is turned clockwise from the position shown (viewed from right to left) valve 28 is drawn to the right relieving the stiff spring pressure thereon and valve 26 is free to move or adjust itself toward stop pins 33. In this position, fuel coming in through the inlet port 46 flows through the ports 47 and 50 opened by movement of valve 28.

Outlet pressure is transmitted through the long hole 59, through the cross hole 61 in the plug 18 to the inside of valve 26. Under these conditions, with valve inlet pressure applied to the outside of valve 26 and valve outlet pressure applied to the inside of valve 26, the valve 26 is being acted on by a force opposing spring 58 which is equal to the difference between inlet and outlet pressure times the effective area of valve 26. The force then compresses the spring 58 opening the bypass port to reduce the inlet pressure until the difference between inlet and outlet pressure reaches a fixed value as established by the thrust of spring 58. For any given spring 58, an essentially constant pressure drop, or difference between inlet and outlet pressure is maintained in the valve. Various rates of flow through the outlet are controlled by the operative area of ports which are opened in valve 28.

Adjustment of the servo (not shown) rotates the threaded shaft 38 for removing or relieving the stiff spring tension from the outer head 30 of piston 26. When the piston 26 is unseated or leaves the seal 24 by the pressure of fuel passing from engine fuel delivery port 52—50 to the engine and through the bores 59 and 61, when the sleeve valve 28 is adjusted to the right to open port 50, the return fuel passage 42 is reduced or closed. The position of the piston valve 26 is thus determined by the pressure of the fuel in space 34 from the pump tending to move valve 26 to the left opening the bypass to fuel tank port 44 and the force of spring 58 plus pressure of the fuel delivered to the engine through the port 50. Fuel pressure to the engine is thus maintained at a predetermined value for each adjustment of the valve 28.

Flow through the outlet 52 is determined from the standard expression:

$$Q = KA\sqrt{\Delta P}$$

where $Q$ = pounds/hour
$K$ = flow constant
$A$ = port opening in sq. in.
$P$ = pressure drop across the port and essentially a constant value, or the difference between inlet and outlet pressure.

Having illustrated and described my invention, I claim:

1. In a fuel control valve, a casing having a cylindrical bore, closure means for the opposite ends of the bore, said casing having a fuel bypass port adjacent one end and adapted to be connected to a fuel tank, a fuel delivery port adjacent the opposite end of said bore adapted to be connected to an engine to supply fuel thereto, and a fuel supply port intermediate said bypass and delivery ports adapted to be connected to a fuel supply pump, a sleeve valve axially adjustable within the bore having a port therein adapted to control said fuel delivery port, adjusting means for determining the adjusted position of the sleeve valve, a piston valve axially slidable in said bore for controlling said fuel bypass port positioned to move intermediate the fuel bypass port and the fuel supply port, a first resilient pressure means operable within the bore for yieldably urging the piston valve to close the bypass port, fluid conduit means connected between the fluid delivery port and the bore to one side of the piston valve for admitting fuel pressure from the fuel delivery port to said one side of the piston valve for supplementing the pressure of said first resilient means on said piston valve, a second resilient means interposed between the opposite side of said piston valve and said sleeve valve having a stiffer yieldability than that of said first yieldable means for yieldably opposing movement of the piston valve to close said bypass port.

2. Apparatus as claimed in claim 1 in which the adjusting means comprises a screw shaft fixed against axial displacement centrally within said bore with one end thereof extending through the closed end thereof which is adjacent said fluid delivery port and is provided with means thereon for rotative adjustment of said shaft and sleeve and extends axially through said sleeve valve with its opposite end projecting toward said piston valve in spaced relation to said piston valve, and said sleeve valve is provided with a central threaded hub portion threadedly received on the screw shaft for axial adjustment of the sleeve valve incident to rotative adjustment of said screw shaft.

3. Apparatus as claimed in claim 2 in which the second yieldable means comprises a helical coil spring surrounding said screw shaft with one end thereof disposed in engagement with said threaded hub portion and the other end disposed for impinging abutment with the piston valve member for moving the piston valve to open said bypass port in opposition to the first yieldable means.

4. Apparatus as claimed in claim 3 in which the first yieldable means comprises a helical coil spring having a greater yieldability than the second yieldable means and interposed between the piston valve and the enclosure for the cylindrical bore for yieldably urging said piston valve to close said bypass port.

5. Apparatus as claimed in claim 4 in which interengaging stop means are provided between said piston valve and said casing for limiting movement of said piston valve by said first yieldable means and fuel pressure from said fuel delivery port admitted through said conduit means toward said sleeve valve means.

6. Apparatus as claimed in claim 5 in which said piston valve comprises a cylindrical cup shaped member surrounding the first yieldable means and formed with a skirt portion slidable in the bore and a concentric stepped down portion facing said sleeve valve forming a shoulder, said skirt portion controlling said bypass port incident to axial adjustment of the piston valve.

7. Apparatus as claimed in claim 6 in which said conduit means comprises a passage extending at one end from said fluid delivery port exteriorly of said sleeve valve with its opposite end in communication with the interior of said bore and the interior of the cup shaped piston member.

8. Apparatus as claimed in claim 7 in which said casing is formed with a cylindrical bore of uniform diameter throughout and cylindrical tubular liner means is fitted within said bore, said liner means having bypass, delivery and discharge ports therein fixed in register with the aforesaid bypass, delivery and discharge ports, said end closure means comprising end closure plugs in the opposite ends of the bore to prevent axial movement of the liner means, fluid sealing means between said liner means and said bore, fluid sealing means between said end closure plugs and said bore, and fluid sealing means between said liner means and said sleeve valve means adapted to straddle said fluid delivery port when the sleeve valve is moved to close the delivery port.

9. Apparatus as claimed in claim 8 in which the closure plug at the bypass port end of the casing is disposed to limit movement of the piston valve toward bypass port opening movement and sealing means is interposed intermittent the piston valve and that end closure plug for preventing fluid leakage between the piston valve and said bore from said fluid supply port when the piston valve is moved to open said bypass port.

10. For metering fuel to a jet engine, a valve mechanism comprising a cylindrical housing, a first and second closing plug for the ends of said housing, a bypass port, a pump-to-valve port and a valve-to-engine port adapted respectively for flow connection from the valve mechanism to a fuel tank, from a pump to the valve mechanism and from the valve mechanism to the engine, a hollow piston having the outer end open and the inner end closed, said outer end being concentrically positioned on the first closing plug, said first closing plug having a peripheral groove equal to the perimeter of the open end of said hollow piston and an O-ring in said groove, said hollow piston being normally positioned to hold said bypass port open but having limited axial movement toward the middle of said housing whereby said bypass valve is closed, a second piston slidable longitudinally in the other end of said housing normally arranged and positioned to hold said valve-to-engine port closed and said pump-to-valve port open but operable by sliding axially one direction from normal to close said pump-to-valve port and operable by sliding axially in the other direction from normal to open said valve-to-engine port, a lead screw having rotative bearing and a seal therefor in the second closing plug and having screw threaded bearing in the said second piston, a light spring held compressed between the first closing plug and the closed end of the first said hollow piston, a stiff spring held slightly compressed between the closed end of the first said hollow piston and the threaded portion of the second said piston, a pressure equalizing hole extending from the valve-to-engine port to the inside of the first said piston, and a pressure equalizing hole extending from the said rotative bearing seal to the said bypass port.

11. For metering fuel from a fuel tank to a jet engine, a valve mechanism comprising a cylindrical housing closed at the ends, a bypass port, a pump-to-valve port and a valve-to-engine port, a hollow piston having the outer end open and the inner end closed, said piston outer end being concentrically positioned inside said housing on the one closed end, the one closed end of the housing adjacent the outer end of the piston on its inside surface having a peripheral groove equal to the perimeter of the open end of said hollow piston and an O ring in said groove, said hollow piston being normally positioned to hold said bypass port open but having limited axial movement toward the middle of said housing whereby said bypass valve is closed, a second piston slidable longitudinally in the other end of said housing normally arranged and positioned to hold said valve-to-engine port closed and said pump-to-valve port open but operable by sliding axially one direction from normal to close said pump-to-valve port and operable by sliding axially in the other direction from normal to open said valve-to-engine port, a lead screw having rotative bearing and a seal therefor in the other closed end and having screw threaded bearing in the said second piston, a light spring held compressed between the first said housing end and the closed end of the first said hollow piston, a stiff spring held slightly compressed between the closed end of the first said hollow piston and the threaded portion of the second said piston, a pressure equalizing hole extending from the valve-to-engine port to the inside of the first said piston, and a pressure equalizing hole extending from the said rotative bearing seal to the said bypass port.

12. A bypassing valve mechanism comprising a cylindrical housing closed at the ends, a bypass port, a pumpto-valve port and a valve-to-engine port in said housing, a cup-shaped piston having its open end concentrically positioned within the housing adjacent one end thereof, the closed end of the housing having a peripheral groove inside equal to the perimeter of the open end of said hollow piston and an O ring in said groove, said hollow piston being normally constructed and positioned to hold said bypass port open but having limited axial movement toward the middle of said housing whereby said bypass valve is closed, a second piston slidable longitudinally in the other end of said housing normally arranged and positioned to hold said valve-to-engine port closed and said pump-to-valve port open but operable by sliding axially one direction from normal to close said pump-to-valve port and operable by sliding axially in the other direction, from normal to open said valve-to-engine port, means extending from said other end of said housing for moving said second piston axially, a seal for said means, a light spring held compressed between the first said closed end and the closed end of the first said hollow piston, and a pressure equalizing hole extending from the valve-to-engine port to the inside of the first said piston.

References Cited in the file of this patent

UNITED STATES PATENTS

| Number | Name | Date |
|---|---|---|
| 1,293,178 | Osborne | Feb. 4, 1919 |
| 2,406,899 | Pugh et al. | Sept. 3, 1946 |
| 2,632,459 | Yingst | Mar. 24, 1953 |